(12) United States Patent
Son

(10) Patent No.: US 11,939,019 B2
(45) Date of Patent: Mar. 26, 2024

(54) ELECTRIC KICKBOARD AND METHOD FOR CONTROLLING THE SAME

(71) Applicants: Hyundai Motor Company, Seoul (KR); Kia Corporation, Seoul (KR)

(72) Inventor: Jaekwang Son, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 393 days.

(21) Appl. No.: 17/386,921

(22) Filed: Jul. 28, 2021

(65) Prior Publication Data
US 2022/0185411 A1 Jun. 16, 2022

(30) Foreign Application Priority Data
Dec. 11, 2020 (KR) .................. 10-2020-0173536

(51) Int. Cl.
*B62H 5/08* (2006.01)
*B62J 25/04* (2020.01)
*B62J 45/20* (2020.01)
*B62K 3/00* (2006.01)
*H04W 4/80* (2018.01)
*H04W 76/14* (2018.01)

(52) U.S. Cl.
CPC ................ *B62H 5/08* (2013.01); *B62J 25/04* (2020.02); *B62J 45/20* (2020.02); *B62K 3/002* (2013.01); *H04W 4/80* (2018.02); *H04W 76/14* (2018.02); *B62K 2202/00* (2013.01)

(58) Field of Classification Search
CPC ... B62H 5/08; B62H 5/003; B62H 5/00; B62J 25/04; B62J 45/20; B62J 45/00; B62K 3/002; B62K 2202/00; H04W 4/80; H04W 76/14; B62M 6/45; E05B 67/003; G07C 9/00309; G07C 9/33
See application file for complete search history.

(56) References Cited

U.S. PATENT DOCUMENTS

2020/0130771 A1* 4/2020 Jacobsz Rosier ........ B62J 45/20
2022/0185409 A1* 6/2022 Guo ....................... B62H 5/003

FOREIGN PATENT DOCUMENTS

| KR | 2016-0100085 A | 8/2016 |
| KR | 2018-0128259 A | 12/2018 |
| KR | 102016244 B1 | 8/2019 |

* cited by examiner

*Primary Examiner* — Michael V Kerrigan
(74) *Attorney, Agent, or Firm* — Fox Rothschild LLP

(57) ABSTRACT

An electric kickboard may include: a top plate of a foot plate including a receiving portion in which an electronic lock device for fixing the electric kickboard is installed; and a bottom plate of the foot plate, which is assembled to the top plate of the foot plate and fixes the electronic lock device.

15 Claims, 6 Drawing Sheets

ELECTRIC KICKBOARD AND METHOD FOR CONTROLLING THE SAME

CROSS-REFERENCE TO RELATED APPLICATION

This application claims under 35 U.S.C. § 119 the benefit of Korean Patent Application No. 10-2020-0173536 filed in the Korean Intellectual Property Office on Dec. 11, 2020, the entire contents of which are incorporated herein by reference.

BACKGROUND

(a) Technical Field

The present disclosure relates to an electric kickboard, more particularly, to the electric kickboard and a method for controlling the same.

(b) Description of the Related Art

In general, a kickboard is driven by putting one foot on a foot plate and kicking the ground with the other foot, and wheels are provided at front and rear sides of the foot plate. However, since the kickboard has propulsive force only when kicking the ground with one foot, there is a disadvantage in that when a user rides the kickboard for a long period of time, the user easily becomes tired. In particular, when moving a long distance, the ground cannot be continuously kicked with one foot, so that there is a problem in that the kickboard should be driven while changing from one foot to the other foot.

With an increase in demand for short-distance travel devices with an emphasis on fun and ease of use, development of a 1-person vehicle, often referred to as a personal mobility device, has increased in recent years. The use of personal mobility devices has spread and as a recent trend, a sharing service utilizing an electric kickboard has spread over the world.

Even among personal mobility devices, a transportation device called the electric kickboard is widely used, and the electric kickboard is generally constituted by a foot plate part which a person boards and a handle part having a handle. An electric motor is installed at a front wheel or a rear wheel of the electric kickboard.

The electric kickboard driven by the electric motor can be electrically driven by starting a motor with a battery power similar to starting of an automobile and even thereafter, driving the electric motor by supplying the battery power.

The above information disclosed in this Background section is only for enhancement of understanding of the background of the disclosure, and therefore it may contain information that does not form the prior art that is already known in this country to a person of ordinary skill in the art.

SUMMARY

The present disclosure provides an electric kickboard and a method for controlling the same, which can prevent theft and loss of the electric kickboard.

An exemplary embodiment of the present disclosure provides an electric kickboard which may include: a top plate of a foot plate including a receiving portion in which an electronic lock device for fixing the electric kickboard is installed; and a bottom plate of the foot plate, which is assembled to the top plate of the foot plate and fixes the electronic lock device.

The electronic lock device may include an electronic wire lock.

The electronic wire lock may include a wire having a length that may be extended or reduced, and a hole into which an end portion of the wire is inserted to fix the end portion of the wire, where the wire and the hole may fix the electric kickboard.

A locking operation and an unlocking operation of the electronic lock device may be controlled by a user device through short-range wireless communication.

The short-range wireless communication may include Bluetooth communication.

A first metallic terminal and a second metallic terminal may be formed on a lower surface of the electronic lock device, and a metallic band may be formed on an upper surface of the bottom plate of the foot plate, and when the top plate of the foot plate and the bottom plate of the foot plate are assembled, the first metallic terminal and the second metallic terminal, and the metallic band may contact each other, and current may flow through the first metallic terminal and the second metallic terminal, and the metallic band Another exemplary embodiment of the present disclosure provides a method for controlling an electric kickboard, including: activating, by a controller controlling an electric lock device fixing an electric kickboard, a function of short-range wireless communication; connecting, by the controller, the electric kickboard and the user device through the short-range wireless communication by searching a user device registered in the controller; and when the electric kickboard and the user device are connected through the short-range wireless communication, controlling, by the user device, the electric kickboard.

The method for controlling an electric kickboard may further include, when the electric kickboard and the user device are connected through the short-range wireless communication, performing, by the controller, authentication for the user device, in which after the authentication for the user device is performed, the user device controls the electric kickboard.

The performing of the authentication for the user device may include checking, by the controller, whether a password of the user device for completion of communication connection between the electric kickboard and the user device is registered in the controller, checking, by the controller, whether the received password and the registered password match each other by receiving the password from the user device when the password of the user device is registered, and when the received password and the registered password match each other, determining, by the controller, that the authentication for the user device is successful.

The method for controlling an electric kickboard may further include, before the controller activates the function of the short-range wireless communication, checking, by the controller, whether a top plate of the foot plate including the electronic lock device is installed on a bottom plate of the foot plate based on current which flows through a first metallic terminal and a second metallic terminal formed on a lower surface of the electronic lock device, and a metallic band formed on an upper surface of the bottom plate of the foot plate of the electric kickboard, in which when the top plate of the foot plate including the electronic lock device is installed on the bottom plate of the foot plate, the controller may activate the function of the short-range wireless communication.

The method for controlling an electric kickboard may further include, when the top plate of the foot plate including the electronic lock device is not installed on the bottom plate of the foot plate, controlling, by the controller, the electric kickboard in a driving prevention state.

The controller may search the user device registered in the controller and connects the electric kickboard and the user device through the short-range wireless communication and perform the authentication for the user device, and the user device for which the authentication is performed may release the driving prevention state of the electric kickboard.

The electronic lock device may include an electronic wire lock.

The short-range wireless communication may include Bluetooth communication.

According to an exemplary embodiment of the present disclosure, in an electric kickboard and a method for controlling the same, since the electric kickboard includes an electronic lock (e.g., an electronic lock device such as an electronic wire lock), the embodiment of the present disclosure can prevent theft or loss of the electric kickboard.

Further, the embodiment of the present disclosure can be controlled by a user device (e.g., a smartphone) through short-range wireless communication (e.g., Bluetooth communication).

BRIEF DESCRIPTION OF THE DRAWINGS

A brief description of each drawing is provided in order to more sufficiently appreciate drawings used in a detailed description of the present disclosure.

DETAILED DESCRIPTION OF THE EMBODIMENTS

Figure 1:
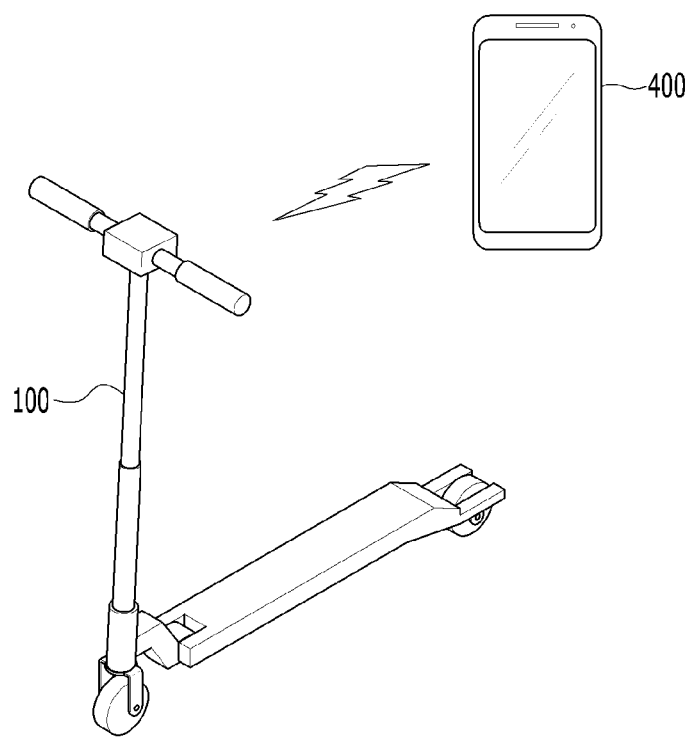
FIG. 1 is a diagram for describing a user device for controlling an electric kickboard according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to sufficiently appreciate objects achieved by the present disclosure and exemplary embodiments of the present disclosure, accompanying drawings illustrating the exemplary embodiments of the present disclosure and contents disclosed in the accompanying drawings should be referred.

Hereinafter, the present disclosure will be described in detail by describing the exemplary embodiments of the present disclosure with reference to the accompanying drawings. In the following description, a detailed explanation of related known configurations or functions may be omitted to avoid obscuring the subject matter of the present disclosure. Like reference numeral presented in each drawing may refer to like element.

Terms used in the present specification are used only to describe specific exemplary embodiments, and are not intended to limit the present disclosure. A singular form may include a plural form if there is no clearly opposite meaning in the context.

Throughout the specification, when it is described that a part is "connected" with another part, it means that the certain part may be "directly connected" with another part and the parts are "electrically or mechanically connected" to each other with a third element interposed therebetween as well.

If not contrarily defined, all terms used herein including technological or scientific terms have the same meanings as those generally understood by those skilled in the art (ordinary skilled in the art) Terms which are defined in a generally used dictionary should be interpreted to have the same meaning as the meaning in the context of the related art, and are not interpreted as an ideal meaning or excessively formal meanings unless clearly defined in the present specification.

Figure 2:
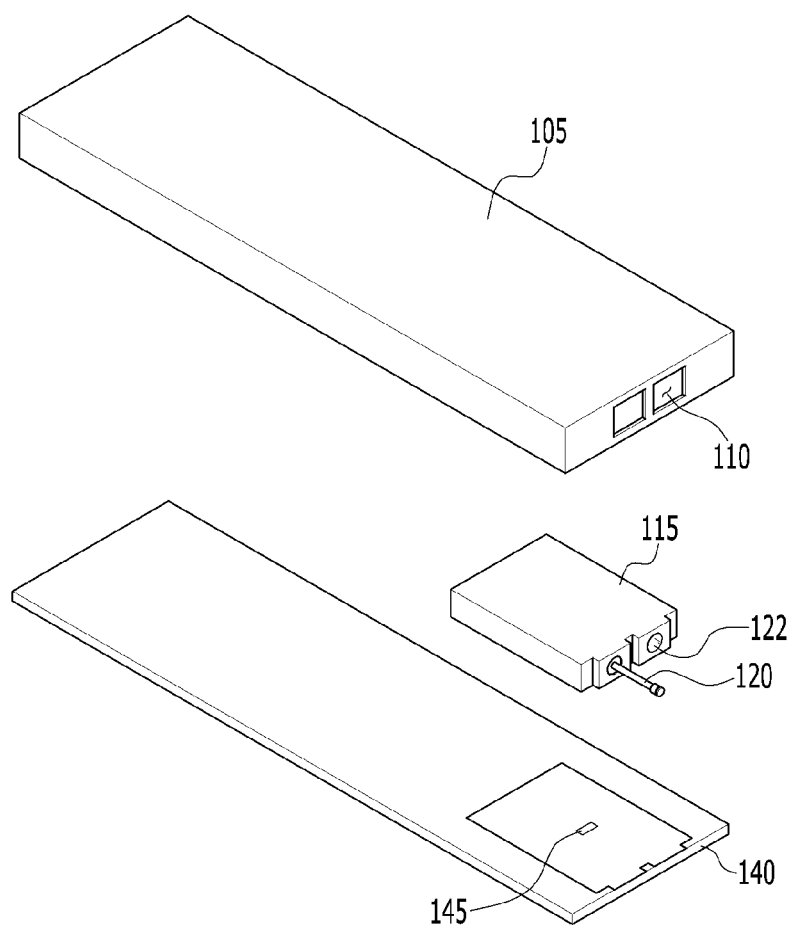
FIG. 2 is a perspective view for describing a top plate and a bottom plate of a foot plate, and an electronic lock device of the electric kickboard illustrated in FIG. 1.
Figure 3:
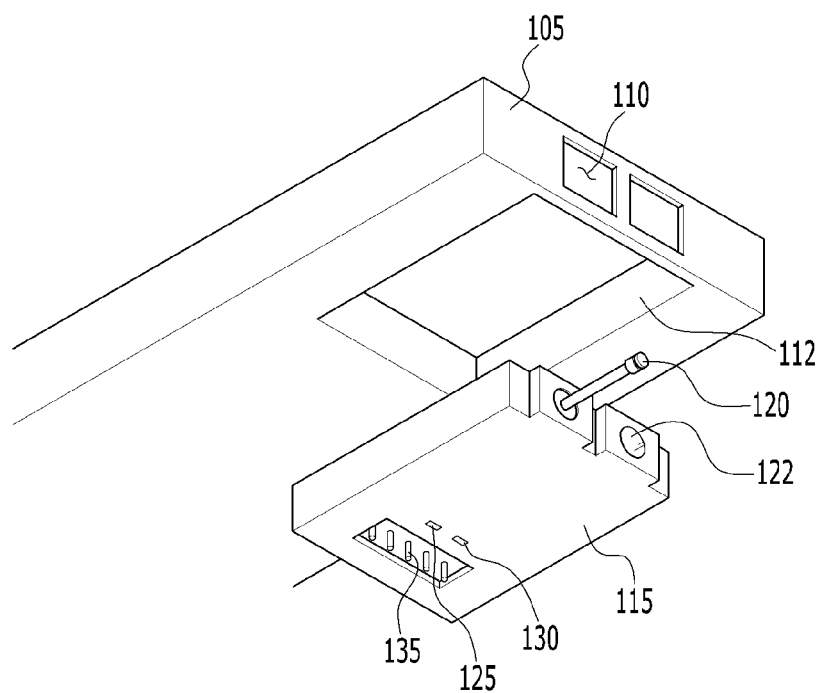
FIG. 3 is a diagram for describing the top plate of the foot plate and the electronic lock device of the electric kickboard illustrated in FIG. 2.
Figure 4:
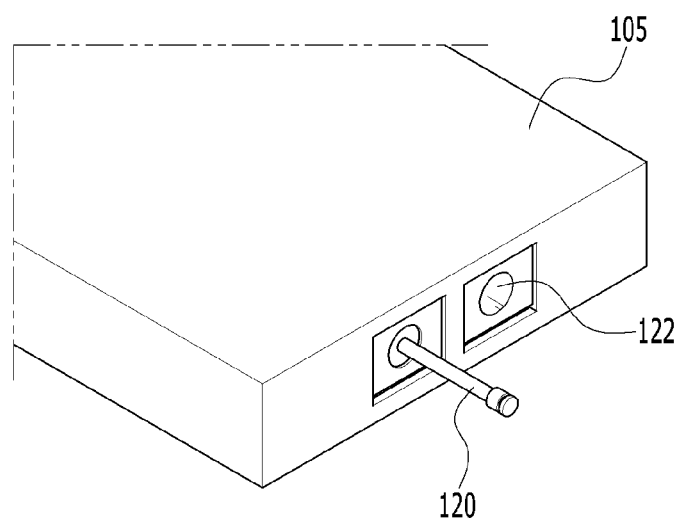
FIG. 4 is a diagram for describing a state in which the top plate and the bottom plate of the foot plate, and the electronic lock device of the electric kickboard illustrated in FIG. 2 are assembled.

FIG. 1 is a diagram for describing a user device for controlling an electric kickboard according to an exemplary embodiment of the present disclosure. FIG. 2 is a perspective view for describing a top plate and a bottom plate of a foot plate, and an electronic lock device of the electric kickboard illustrated in FIG. 1. FIG. 3 is a diagram for describing the top plate of the foot plate and the electronic lock device of the electric kickboard illustrated in FIG. 2. FIG. 4 is a diagram for describing a state in which the top plate and the bottom plate of the foot plate, and the electronic lock device of the electric kickboard illustrated in FIG. 2 are assembled.

Referring to FIGS. 1 to 4, the electric kickboard (or an electric kickboard scooter) 100 may be controlled by a user device 400 such as a smartphone through short-range wireless communication (e.g., Bluetooth communication).

The electric kickboard 100 may include a foot plate, a front wheel and a rear wheel installed on the front and the rear of the foot plate, a handle steering the front wheel, and an electric motor installed in the front wheel or the rear wheel and using a battery as a power source. The electric kickboard 100 may include a top plate 105 of the foot plate including a receiving portion (e.g., a concave portion) 112 at which an electronic lock device 115 for fixing the electric kickboard is installed (or received), and a bottom plate 140 of the foot plate assembled to the top plate of the foot plate and fixing the electronic lock device 115.

The user device 400 may control a locking operation and an unlocking operation of the electronic lock device 115 of the electric kickboard 100 preventing movement of the electric kickboard 100 or fixing the electric kickboard. For example, the electronic lock device 115 may include an electronic wire lock.

The electronic wire lock 115 may include a wire 120 having a length that may be extended or reduced, and a hole 122 into which an end portion of the wire is inserted to fix the end portion of the wire. The wire 120 and the hole 122 may fix the electric kickboard 100. When the electronic wire lock 115 is assembled to the top plate 105 of the foot plate, the wire 120 and the hole 122 may be assembled through holes 110 formed on a lateral surface of the top plate 105 of the foot plate. A user of the electric kickboard 100 suspends or connects the wire 120 onto the front wheel or the rear wheel of the electric kickboard or an external object other than the electric kickboard and then inserts the wire 120 into the hole 122 to fix the electric kickboard.

A terminal 135 for communication with a controller of the electric kickboard 100 controlling the electronic wire lock may be formed on a lower surface of the electronic wire lock 115. The electronic wire lock 115 may receive power (driving power) through the terminal 135.

A first metallic terminal 125 and a second metallic terminal 130 may be formed on the lower surface of the electronic wire lock 115, and a metallic band (or a metallic line) 145 may be formed on an upper surface of the bottom plate 140 of the foot plate. When the top plate 105 and the bottom plate 140 of the foot plate including the electronic wire lock 115 are accurately assembled, the first metallic terminal 125 and the second metallic terminal 130, and the metallic band 145 contact, and as a result, current may flow through the first metallic terminal 125 and the second metallic terminal 130, and the metallic band 145. The controller of the electric kickboard 100 may control the current to flow. By the first metallic terminal 125 and the second metallic terminal 130, and the metallic band 145, it may be confirmed that the electronic lock device 115 is accurately assembled to the bottom plate 140 of the foot plate.

When the top plate 105 and the bottom plate 140 of the foot plate are not accurately assembled, the current may not flow.

Figure 5:
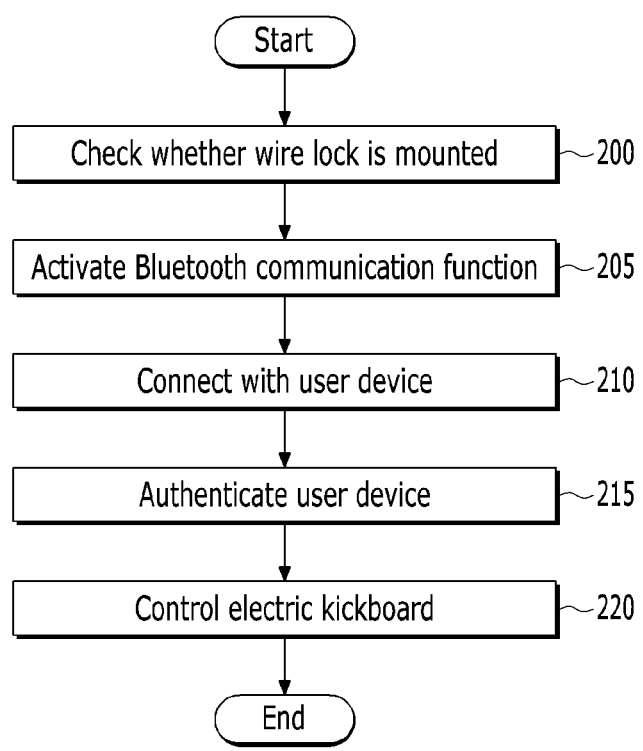
FIG. 5 is a flowchart for describing a method for controlling an electric kickboard according to an exemplary embodiment of the present disclosure.
Figure 6:
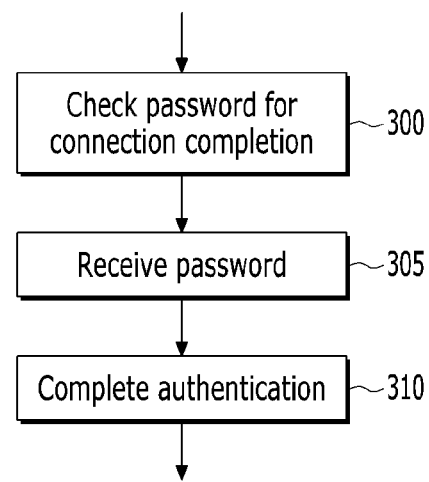
FIG. 6 is a flowchart for describing an authentication step illustrated in FIG. 5.

FIG. 5 is a flowchart for describing a method for controlling an electric kickboard according to an exemplary embodiment of the present disclosure. FIG. 6 is a flowchart for describing an authentication step illustrated in FIG. 5.

Referring to FIGS. 1 to 6, in a checking step 200, a controller of an electric kickboard 100 may check whether a top plate 105 of a foot plate including an electronic wire lock is mounted (installed) on a bottom plate 140 of the foot plate based on current which flows through a first metallic terminal 125 and a second metallic terminal 130 formed on a lower surface of the electronic wire lock, and a metallic band 145 formed on an upper surface of the bottom plate 140 of the foot plate.

The controller as an electronic control unit (ECU) may control an overall operation of the electric kickboard 100. The controller may turn on or off a power source of the electric kickboard 100. A user of the electric kickboard 100 may also turn on or off the power source of the electric kickboard 100.

The controller may be, for example, one or more microprocessors which operate by a program (control logic) or hardware (e.g., a microcomputer) including the microprocessors and the program may include a series of instructions for performing the method for controlling the electric kickboard according to an exemplary embodiment of the present disclosure. The instructions may be stored in a memory of the controller.

According to step 205, when the top plate 105 of the foot plate including the electronic wire lock 115 is installed on the bottom plate 140 of the foot plate, the controller may activate a Bluetooth communication function which is a short-range wireless communication function. For example, the controller transmits an advertising packet for connection (or pairing) with a peripheral Bluetooth device of the electronic wire lock 115 to search the peripheral Bluetooth device.

According to step 210, the controller searches a user device 400 registered in the controller to connect the electric kickboard 100 and the user device 400 through Bluetooth communication.

According to step 215, after step 210, the controller may perform authentication for the user device 400.

Referring to FIG. 6, an embodiment of step 215 is described as below.

According to step 300, the controller may check whether a password of the user device 400 for completion of communication connection between the electric kickboard 100 and the user device 400 is registered in the controller. When the password of the user device 400 is not registered, the controller may request to register the password in the user device 400.

According to step 305, when the password of the user device 400 is registered, the controller receives a password from the user device to check whether the received password and the registered password match each other. When the received password and the registered password do not match each other, the controller counts the number of mismatch times of the password and when the number of mismatch times exceeds the reference number of times (e.g., 5 times), the controller may stop an authentication procedure for the user device 400 for a reference time (e.g., 5 minutes).

According to step 310, when the received password and the registered password match each other, the controller may determine that the authentication for the user device 400 is completed (or successful).

According to step 220 of FIG. 5, when the authentication for the user device 400 is successful, the user device 400 may control the electric kickboard 100. For example, the user device 400 may turn on or off the power source of the electric kickboard 100 through the Bluetooth communication. Even while the power source of the electric kickboard 100 is turned off, the user device 400 may control a locking operation and an unlocking operation of the electronic wire lock 115 through the Bluetooth communication.

In another exemplary embodiment of the present disclosure, step 215 may be skipped.

When the top plate 105 of the foot plate including the electronic wire lock 115 is not accurately installed on the bottom plate 140, the controller may control the electric kickboard 100 in a driving prevention state. After steps which are the same as or similar to steps 205, 210, and 215, the user device 400 may release the driving prevention state of the electric kickboard 100.

A component, unit, block, or module used in the exemplary embodiment of the present disclosure may be implemented as software such as a task, a class, a sub routine, a process, an object, an execution thread, and a program performed in a predetermined area on the memory or hardware such as field programmable gate array (FPGA) or application-specific integrated circuit (ASIC) and further, may be achieved by combining the software and the hardware. The component or unit may be included in a computer readable storage medium and some of the component or unit may be dispersedly distributed in a plurality of computers.

As described above, the embodiment is disclosed in the drawings and the specification. Although specific terms have been used herein, the terms are only used for the purpose of describing the present disclosure and are not used to limit a meaning or limit the scope of the present disclosure as defined in the claims. Therefore, those skilled in the art will appreciate that various modifications and equivalent embodiments can be made from the present disclosure. Accordingly, the true technical scope of the present disclosure should be defined by the technical spirit of the appended claims.

What is claimed is:

1. An electric kickboard comprising:
    a top plate of a foot plate including a receiving portion in which an electronic lock device for fixing the electric kickboard is installed; and
    a bottom plate of the foot plate, which is assembled to the top plate of the foot plate and fixes the electronic lock device.

2. The electric kickboard of claim 1, wherein the electronic lock device includes an electronic wire lock.

3. The electric kickboard of claim 2, wherein the electronic wire lock includes:
    a wire having a length configured to be extended or reduced, and
    a hole into which an end portion of the wire is inserted to fix the end portion of the wire, wherein
    the wire and the hole are configured to fix the electric kickboard.

4. The electric kickboard of claim 1, wherein a locking operation and an unlocking operation of the electronic lock device are controlled by a user device through wireless communication.

5. The electric kickboard of claim 4, wherein the wireless communication includes Bluetooth® communication.

6. The electric kickboard of claim 1, wherein a first metallic terminal and a second metallic terminal are formed on a lower surface of the electronic lock device, and a metallic band is formed on an upper surface of the bottom plate of the foot plate.

7. The electric kickboard of claim 6, wherein when the top plate of the foot plate and the bottom plate of the foot plate are assembled, the first metallic terminal and the second metallic terminal, and the metallic band contact each other, and current flows through the first metallic terminal and the second metallic terminal, and the metallic band.

8. A method for controlling an electric kickboard, the method comprising:
    activating, by a controller controlling an electric lock device fixing an electric kickboard, a function of short-range wireless communication;
    connecting, by the controller, the electric kickboard and the user device through the short-range wireless communication by searching a user device registered in the controller; and
    when the electric kickboard and the user device are connected through the short-range wireless communication, controlling, by the user device, the electric kickboard.

9. The method of claim 8, further comprising:
    when the electric kickboard and the user device are connected through the short-range wireless communication, performing, by the controller, authentication for the user device,
    wherein after the authentication for the user device is performed, the user device controls the electric kickboard.

10. The method of claim 9, wherein performing the authentication for the user device includes:
    checking, by the controller, whether a password of the user device for completion of communication connection between the electric kickboard and the user device is registered in the controller,
    checking, by the controller, whether the received password and the registered password match each other by receiving the password from the user device when the password of the user device is registered, and
    when the received password and the registered password match each other, determining, by the controller, that the authentication for the user device is successful.

11. The method of claim 8, further comprising:
    before the controller activates the function of the short-range wireless communication, checking, by the controller, whether a top plate of the foot plate including the electronic lock device is installed on a bottom plate of the foot plate based on current which flows through a first metallic terminal and a second metallic terminal formed on a lower surface of the electronic lock device, and a metallic band formed on an upper surface of the bottom plate of the foot plate of the electric kickboard,
    wherein when the top plate of the foot plate including the electronic lock device is installed on the bottom plate of the foot plate, the controller activates the function of the short-range wireless communication.

12. The method of claim 11, further comprising:
when the top plate of the foot plate including the electronic lock device is not installed on the bottom plate of the foot plate, controlling, by the controller, the electric kickboard in a driving prevention state.

13. The method of claim 12, wherein:
the controller searches the user device registered in the controller and connects the electric kickboard and the user device through the short-range wireless communication and performs the authentication for the user device, and
the user device for which the authentication is performed releases the driving prevention state of the electric kickboard.

14. The method of claim 8, wherein the electronic lock device includes an electronic wire lock.

15. The method of claim 8, wherein the short-range wireless communication includes Bluetooth® communication.

\* \* \* \* \*